Aug. 10, 1943.   B. L. MALLORY   2,326,665
SHOCK ABSORBER
Filed Nov. 26, 1941   2 Sheets-Sheet 1

INVENTOR.
Bonnie L. Mallory
BY Hull West
ATTORNEYS.

Aug. 10, 1943.     B. L. MALLORY     2,326,665
SHOCK ABSORBER
Filed Nov. 26, 1941     2 Sheets-Sheet 2

INVENTOR.
Bonnie L. Mallory
BY Hull West
ATTORNEYS.

Patented Aug. 10, 1943

2,326,665

UNITED STATES PATENT OFFICE 2,326,665

SHOCK ABSORBER

Bonnie L. Mallory, Cleveland Heights, Ohio

Application November 26, 1941, Serial No. 420,547

10 Claims. (Cl. 188—130)

This invention relates to shock absorbers of the friction type. The main objects of the invention are to provide a shock absorber of this type that requires no lubrication; that is smooth and silent of action; that is devoid of springs and is very durable and is practically immune from disorder; that is highly efficient; that can be manufactured at low cost, and that requires no attention or adjustment after installation.

Another object of the invention is to provide a shock absorber of the character described which, during fabrication, by simply changing the relation of certain of its parts, may be adapted, with regard to its snubbing power, to vehicles of different weights.

Another object of the invention is to provide a shock absorber of the friction type which consists essentially of a two-part drum, a shaft non-rotatably connected with the drum and adapted to be partially rotated in opposite directions when the vehicle body moves toward or away from the axles, together with means for resisting the rotation of the drum in such manner that the maximum resistance is offered to the rotation of the drum when the vehicle moves away from the axles.

Another object of the invention is to provide a friction type shock absorber which consists of few parts that are well adapted for production at low cost, and are especially convenient of assembly.

A further object is to provide a symmetrical design for a shock absorber that requires only the reversal of certain of its parts during assembly to change it from a right hand to a left hand model whereby the same is adapted for installation on either side of a vehicle.

A still further object of the invention is to completely eliminate the annoying chatter, screeching or moaning that so frequently attends the operation of friction type shock absorbers, and this is accomplished by the use of so-called split leather, desirably chrome tanned, as the friction material in lieu of the customary brake lining.

Figure 1:
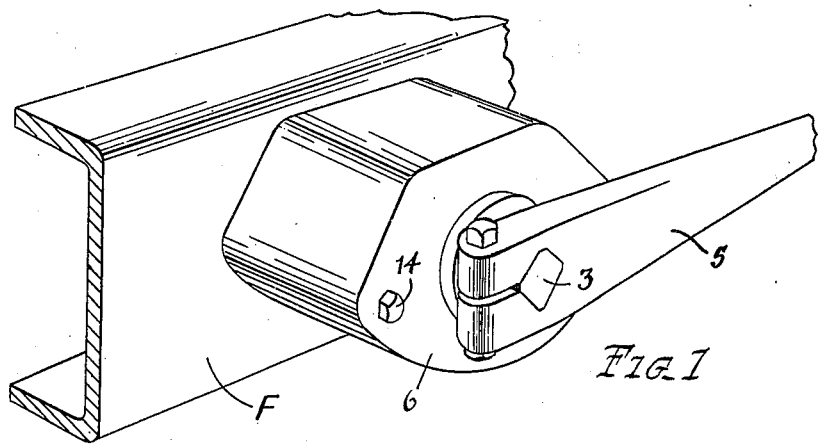
Figure 2:
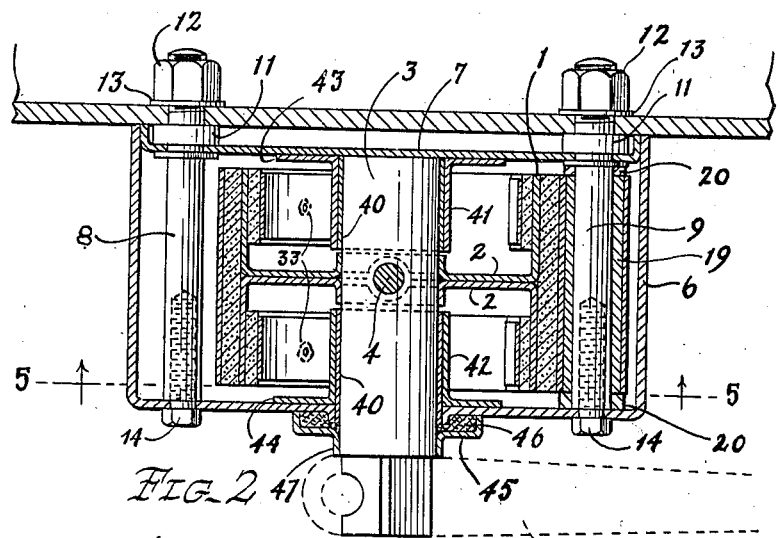
Figures 3, 4:
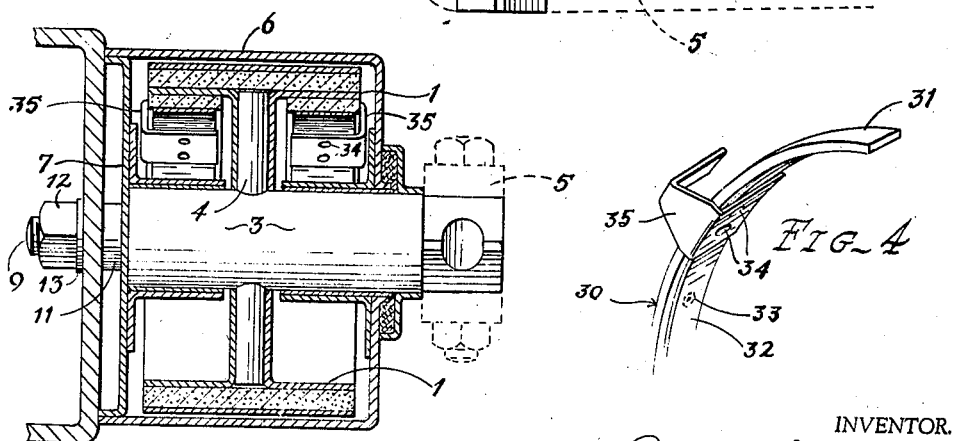
Figure 5:
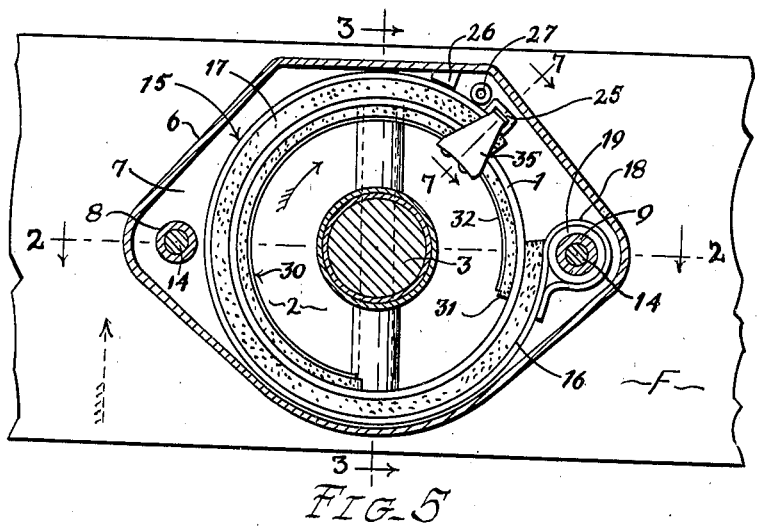
Figure 6:
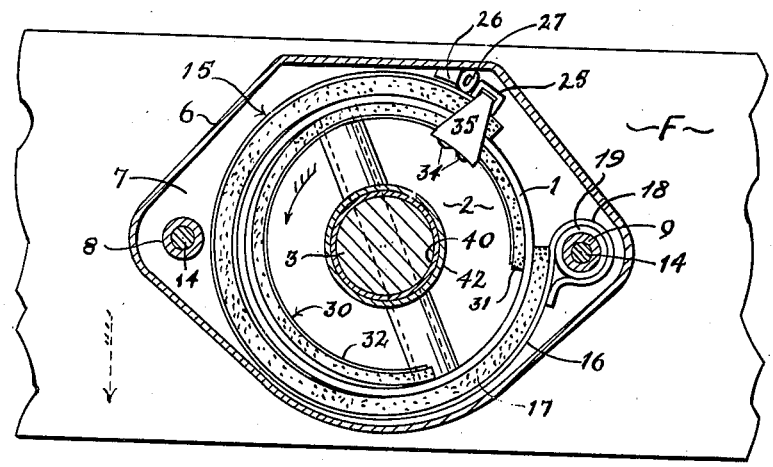
Figure 7:
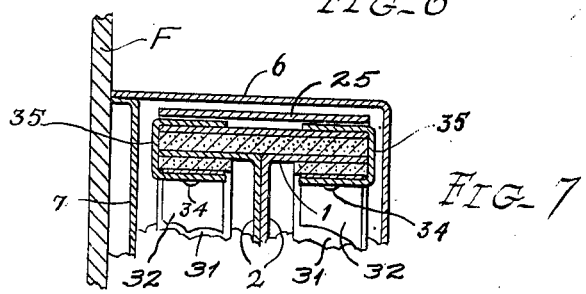

Further and more limited objects of the invention will appear as the description proceeds, and wherein reference is made to the accompanying drawings in which Fig. 1 is a perspective view of my improved shock absorber; Fig. 2 is a central horizontal section through the same on the line 2—2 of Fig. 5; Fig. 3 is a central vertical section on the line 3—3 of Fig. 5; Fig. 4 is a fragmentary perspective view of one of the drag shoes; Fig. 5 is a section on the line 5—5 of Fig. 2, showing the brake parts in checking or snubbing condition, as when the vehicle body is moving upward relative to the axles, as indicated by the dotted line arrow, and the drum is rotating clockwise, according to the full line arrow appearing thereon; Fig. 6 is a view similar to Fig. 5 showing the brake parts relaxed under reverse conditions, and Fig. 7 is a sectional detail on the line 7—7 of Fig. 5.

Referring now to the drawings by the use of reference characters, 1 is a brake drum, shown as consisting of a pair of reversely arranged cup-shaped members, preferably drawn from sheet metal and having their flat annular bottom walls 2 welded together. Extending through central flanged openings provided in the walls 2, and the flanges whereof constitute a hub for the drum, is a shaft 3 which is non-rotatably secured to the drum by a pin 4, the end portions of which occupy radial semi-cylindrical depressions in the walls 2. The outer end of the shaft is shaped to non-rotatably receive one end of an arm 5 the opposite end of which is adapted to be connected to the axle of a vehicle so as to impart rotation to the shaft and drum when the vehicle body moves in either direction toward or away from the vehicle axles. The connection between the arm 5 and the axle may follow common practice wherein a link of suitable character is used. Enclosing the brake drum, and the parts cooperating therewith and later to be described, is a housing which is made up of an open end casing 6 and a flanged base 7 over which the open end of the casing fits. Extending through the housing are a pair of studs 8 and 9. Each stud is non-rotatably secured to the base 7, as by having a part swaged within a hole of the base that is preferably other than circular; and each stud is also provided with an integral collar 11 that corresponds in thickness substantially to the width of the peripheral flange of the base. Threaded portions of the studs extend through the frame F of the vehicle and are secured thereto by means of nuts 12, and suitable washers 13. The opposite or forward ends of the studs have axial threaded bores that register with apertures in the end wall of the casing and receive screws 14 which firmly secure the casing to the studs.

A brake band, designated generally by the numeral 15, and made up of a metal strap 16, and a lining 17 that is riveted or otherwise secured to the strap, nearly surrounds and bears upon the outer surface of the drum 1 throughout the width thereof. One end of the metal strap 16 is formed to provide an eye 18 which is engaged about a bushing 19 mounted on the stud 9.

Washers 20 surround the stud 9 beyond the opposite ends of the bushing 19 and serve to retain the bushing and the brake band 15 approximately transversely central within the casing 6. The end of the metal strap 16 opposite the eye 18 is shown as formed into a rectangular loop 25. The inner end of the loop provides a shoulder between which, and an abutment or stop 26 on the casing is disposed a cushion member 27 which, for the sake of economy and convenience, may consist of a piece of thick walled rubber tubing.

Within each cup-like member of the brake drum 1 is a drag shoe designated generally by the numeral 30 and comprising a strap 31 of so-called split leather, preferably chrome tanned, although other friction material may be employed. By preference I employ the same kind of leather for the lining 17 of the brake band 15. The drag shoe includes, also, a strip 32 of relatively thin resilient metal. The strap 31 and metal strip 32 are suitably connected together, as by rivets 33 (Figs. 2 and 4). Connected to the drag shoes near one end thereof, as by rivets 34, are the inner branches or base flanges of U-shaped connectors 35, the outer narrower branches whereof extend into the opposite ends of the loop 25 and are capable of rocking action therein, as will hereinafter more fully appear.

The portions of the shaft 3 that extend beyond the hub of the brake drum are journaled in self-lubricating bearings 40 that are confined within bearing sleeves 41 and 42. The former is provided with an end flange 43 that is spot welded or otherwise secured to the base 7, and the latter with an end flange 44 that is similarly attached to the end wall of the casing 6 about an outwardly flanged aperture therein through which the outer end of the corresponding bearing 40 extends. Surrounding said aperture is a dust cap 45, containing suitable packing material 46, the cap having a hub portion 47 that surrounds and bears upon the end of the shaft adjacent the arm 5.

As explained above, the shock absorber is secured to the frame F of the vehicle, while the free end of the arm 5 is connected by a link (not shown) to an axle of the vehicle. When the road wheel on said axle strikes a bump which causes the axle to be elevated relative to the body of the vehicle, such action being permitted by the vehicle springs, as will be readily understood, the free end of the arm is thrust upwardly and imparts to the drum 1 rotation in a counter-clockwise direction, as indicated by the full line arrow in Fig. 6, the dotted line arrow in said view indicating the direction of concurrent movement of the vehicle frame relative to that of the axle. When the drum rotates in the direction stated, the drag shoes 30 tend to follow it and the major portions of their longer branches are actually withdrawn from the peripheral walls of the drum members by the tendency of the free ends of said branches to follow the drum. This bodily movement of the drag shoes, in their tendency to follow the counter-clockwise rotation of the drum, is transmitted, through the connectors 35, to the free end of the brake band 15, causing the latter, throughout much of its length to withdraw from the outer surface of the drum and consequently to relax its binding or braking action thereon. During the foregoing operation, the outer branches of the connectors 35 are permitted to rock slightly within the loop 25, the extent being dependent upon how much the adjacent portions of the longer branches of the drag shoes withdraw from the drum. It is during relaxation of the brake band, as just described, that the loop 25 engages the cushion member 27 and urges the latter against the abutment or stop 26, the cushion member and stop thus serving to limit the extent to which the brake band is permitted to relax.

With the brake band relaxed, as above described, the drum 1 is quite free to rotate in a counter-clockwise direction as when the vehicle frame and axle are moving relatively toward each other. Now upon a reversal of these conditions, as when the frame, through the action of the vehicle springs, tends to rise with respect to the axle, the drum is caused to travel in a clockwise direction, as indicated by the full line arrow in Fig. 5. Instantly upon reversal in the direction of rotation of the drum, the drag shoes expand against and follow the drum, which action of the drag shoes is transmitted, through the connectors 35, to the brake band 15, causing it to tightly contract about the drum 1 and retard its rotation, thus checking or snubbing the rebound of the vehicle frame.

The drag shoes 30 may, if desired, extend almost entirely about the inner surfaces of the drum members, it being only necessary to leave enough room between the opposite ends of each shoe to insure substantial contraction of the shoe when the drum rotates in a counter-clockwise direction; and the length of the longer branches of the drag shoes determines the power with which they function in the application or contraction of the brake band. If greater braking force is required, due to the weight of the vehicle body on which the shock absorbers are to be used, the drag shoes are shifted with respect to the connectors 35 so as to further extend their longer branches.

As previously stated, split leather, preferably of the chrome tanned variety, is desirably employed for the lining 17 of the brake band and for straps 31 of the drag shoes. This product is derived from the tanned hides of animals and is the spongy fibrous portion left after splitting off a relatively thin layer next to the hair-bearing surface of the hide. I have found that this material is ideal for the purpose inasmuch as it retains its compressibility indefinitely under the most rigorous action of the shock absorber and, notwithstanding the absence of lubricant of any sort, will not screech, moan or chatter, as ordinary friction material or brake lining invariably does.

Most shock absorbers including levers or arms are made in right and left hand models for use on the opposite sides of a vehicle, so that the arms of the opposed absorbers project in the same direction. This is made especially easy by my construction and symmetrical design. The abutment 26 is simply shifted to the other side of the vertical axis of the casing (or two abutments may be incorporated in the beginning); the brake band 15 is reversed by transferring the bushing 19 and eye 18 to the post 8; the drag shoes are correspondingly reversed within the drum, and the drum is then turned over so that the arm 5 extends in the opposite direction.

Having thus described my invention, what I claim is:

1. In a shock absorber, the combination of a cylindrical drum, a shaft to which the drum is secured, a structure whereby the shaft is supported for oscillation, means through which oscillatory movement is adapted to be imparted to the shaft, a brake band extending part way about said drum in a plane normal to the axis thereof and having one end attached to said structure, a drag shoe, and a connector by means of which said drag shoe is attached to the opposite end of the band, said drag shoe frictionally engaging a part of the drum other than its exterior cylindrical surface for tensioning said band.

2. In a shock absorber, the combination of a hollow drum, a shaft to which the drum is secured, a structure whereby the shaft is supported for oscillation, means for imparting oscillatory movement to the shaft, a brake band extending about said drum and having one end attached to said structure, and a drag shoe connected to the opposite end of the band and engaging the inner side of the drum for tensioning said band.

3. In a shock absorber, the combination of a hollow drum, a shaft to which the drum is secured, the shaft being adapted to receive an arm at one end thereof, a structure by which the shaft is supported for oscillation, a brake band extending about the drum and having one end attached to said structure, and a drag shoe connected to the opposite end of the band and engaging the inner side of the drum and acting to relax the band when the drum rotates in one direction and to tension the band when the drum rotates in the reverse direction.

4. In a shock absorber, the combination of a hollow drum, a shaft adapted to receive an arm at one end thereof, means forming a driving connection between said shaft and drum, a housing enclosing said drum, a stud within said housing adjacent the drum and substantially parallel to the shaft, a brake band extending about said drum and having one end secured to said stud, and a drag shoe engaging a part of the drum and connected to the brake band for tensioning said band.

5. In a shock absorber, the combination of a drum made up of a pair of cup-like members having their end walls engaged and secured together, said walls having registering openings, a shaft extending through said openings and adapted to receive an arm at one end thereof, a pin extending diametrically through the shaft with its end portions in semi-cylindrical depressions of the aforesaid walls, thus forming a driving connection between said shaft and drum, a housing enclosing said drum, a friction band extending about said drum and having one end attached to the housing, and means operatively connected to its opposite end for tensioning said band.

6. In a shock absorber, the combination of a drum made up of a pair of reversely arranged cup-like members, a shaft extending longitudinally through said drum and adapted to receive means at one end thereof by which the shaft may be oscillated, means forming a driving connection between said shaft and drum, a housing enclosing said drum, a stud in said housing adjacent the drum, a brake band extending about said drum and maving one end attached to said stud, a drag shoe operating against the inner side of each drum member, and connections between said drag shoes and the opposite end of said band.

7. In a shock absorber, the combination of a drum made up of a pair of reversely arranged cup-like members, a shaft extending axially through said drum and adapted to receive an arm at one end thereof, means forming a driving connection between said shaft and drum, a housing enclosing said drum, a pair of studs extending through said housing adjacent diametrically opposed parts of the drum, a brake band extending about said drum and having one end detachably connected to one of said studs so that said end may be shifted to the other stud, reversible drag shoes operating against the inner sides of the drum members, and connections between said shoes and the opposite end of said band.

8. In a shock absorber, the combination of a drum, a shaft to which the drum is secured, a structure by which the shaft is supported for oscillation, means through which oscillatory movement is adapted to be imparted to the shaft, a brake band extending about the drum and reversible with respect thereto and having one end detachably connected to said structure, a drag shoe connected to the opposite end of the band and engaging a part of the drum and acting to relax the band when the drum rotates in one direction and to tension the band when the drum rotates in the reverse direction, said drag shoe also being reversible with respect to the drum.

9. In a shock absorber, the combination of a cylindrical drum, a shaft wherewith the drum has driving connection, a structure by which the shaft is supported for oscillation, means through which oscillatory movement is adapted to be imparted to said shaft, a brake band having a lining of friction material and extending about said drum, the band having one end attached to said structure, a drag shoe including a piece of friction material engaging a part of the drum other than its exterior cylindrical surface, and a connector attaching said drag shoe to the brake band so that the retarding action of said shoe tensions said band.

10. In a shock absorber, the combination of a hollow drum, a shaft wherewith the drum has driving connection, a structure by which the shaft is supported for oscillation, means through which oscillatory movement is adapted to be imparted to said shaft, a brake band having a lining of friction material and extending about the exterior of said drum, the band having one end attached to said structure, a drag shoe including a piece of friction material engaging the inner surface of the drum, and a connector attaching said drag shoe to the brake band so that the retarding action of said shoe tensions said band.

BONNIE L. MALLORY.